US 7,929,018 B2

(12) United States Patent
Hashimoto

(10) Patent No.: US 7,929,018 B2
(45) Date of Patent: Apr. 19, 2011

(54) IMAGING APPARATUS AND METHOD OF DISPLAYING AN OPERATION SELECTION SCREEN

(75) Inventor: Tetsuya Hashimoto, Inzai (JP)

(73) Assignee: Ricoh Company, Ltd., Toyota (JP)

( * ) Notice: Subject to any disclaimer, the term of this patent is extended or adjusted under 35 U.S.C. 154(b) by 342 days.

(21) Appl. No.: 11/913,270

(22) PCT Filed: May 8, 2006

(86) PCT No.: PCT/JP2006/309614
§ 371 (c)(1),
(2), (4) Date: Oct. 31, 2007

(87) PCT Pub. No.: WO2006/123594
PCT Pub. Date: Nov. 23, 2006

(65) Prior Publication Data
US 2008/0192121 A1    Aug. 14, 2008

(30) Foreign Application Priority Data

May 16, 2005    (JP) ................................ 2005-142314

(51) Int. Cl.
*G06F 3/12* (2006.01)
(52) U.S. Cl. .............. 348/207.2; 348/207.1; 348/207.11
(58) Field of Classification Search ............... 348/207.1, 348/207.2
See application file for complete search history.

(56) References Cited

U.S. PATENT DOCUMENTS

| 6,285,842 B1 | 9/2001 | Katamoto et al. |
| 6,288,792 B1 | 9/2001 | Yoshida et al. |
| 7,474,430 B2 | 1/2009 | Onuma et al. |
| 2001/0030766 A1* | 10/2001 | Yamamoto .................... 358/1.15 |
| 2003/0121005 A1 | 6/2003 | Herbst et al. |
| 2003/0122932 A1* | 7/2003 | Shiohara .................... 348/207.2 |
| 2003/0231341 A1 | 12/2003 | Aichi et al. |
| 2004/0169730 A1* | 9/2004 | Tamura et al. ............. 348/207.2 |
| 2004/0179105 A1* | 9/2004 | Endo et al. ................. 348/211.1 |
| 2004/0260800 A1 | 12/2004 | Gu et al. |
| 2005/0002061 A1 | 1/2005 | Uchida et al. |
| 2005/0012954 A1* | 1/2005 | Onuma et al. ............... 358/1.13 |
| 2005/0052676 A1* | 3/2005 | Masumoto et al. .......... 358/1.13 |
| 2005/0083411 A1 | 4/2005 | Cozier et al. |
| 2005/0122539 A1* | 6/2005 | Sugimoto .................... 358/1.15 |

FOREIGN PATENT DOCUMENTS

| CN | 1576035 A | 2/2005 |
| EP | 1 182 860 A2 | 2/2002 |
| EP | 1 182 860 A3 | 2/2002 |
| EP | 1 443 397 A2 | 8/2004 |
| EP | 1 443 397 A3 | 8/2004 |
| JP | 11 88815 | 3/1999 |
| JP | 11 146311 | 5/1999 |
| JP | 2000-331181 | 11/2000 |
| JP | 2003-316892 | 11/2003 |
| JP | 2004 227351 | 8/2004 |
| JP | 2005 38056 | 2/2005 |
| KR | 10-2005-0009223 | 1/2005 |

* cited by examiner

*Primary Examiner* — David L Ometz
*Assistant Examiner* — Dwight Alex C Tejano
(74) *Attorney, Agent, or Firm* — Oblon, Spivak, McClelland, Maier & Neustadt, L.L.P.

(57) ABSTRACT

An image apparatus, including: a recording unit configured to record therein as an image file an image data generated through conversion from an optical image representing a photographed subject into an electrical signal; an interface for connecting the imaging apparatus to an external device; and a displaying unit configured to display an operation screen according to information about a capability processable by the external device transmitted from the external device.

19 Claims, 7 Drawing Sheets

FIG.5
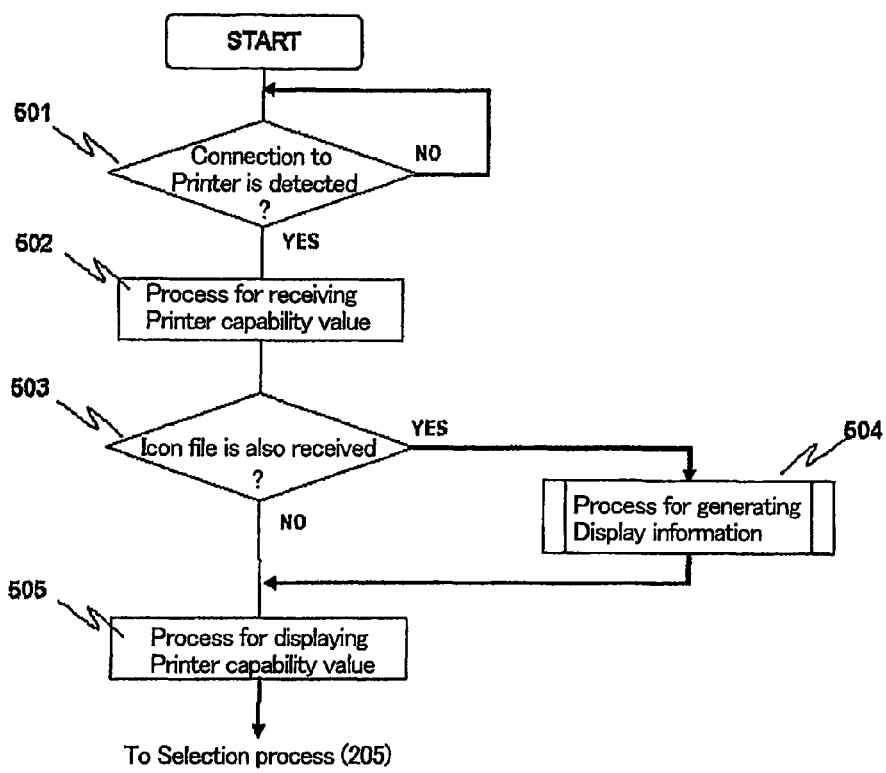
FIG.6
```
<printer Capabilitys>               30
    <listLayouts>                   31
        <lineFormatA/>
        <lineFormatB/>              32
        <lineFormatC/>
        <lineFormatD/>
    </listLayouts>
</printer Capability>
```
FIG.7
</printer Capability>
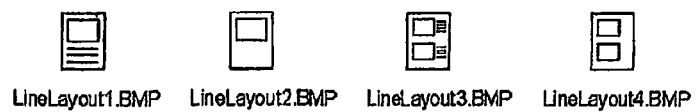
LineLayout1.BMP  LineLayout2.BMP  LineLayout3.BMP  LineLayout4.BMP

```
<printer Capabilitys>
    <listLayouts>
        <lineFormatA/>
        <lineFormatB/>
        <lineFormatC/>
        <lineFormatD/>
    </listLayouts>
    <listLayoutKomaNum>
        <1 />
        <1 />
        <2 />
        <2 />
    </listLayoutKomaNum>
    <listLayoutLine>
        <on />
        <off/>
        <on/>
        <off/>
    </listLayoutLine>
</printer Capability>
```

FIG.10
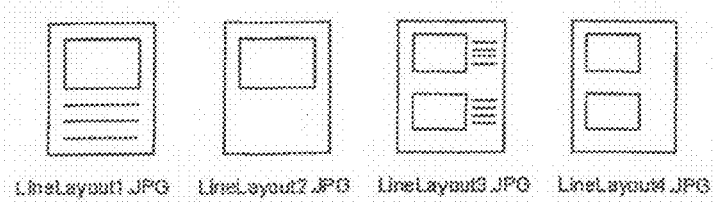
FIG.11
Root─LineLayout─LineLayout1.jpg
              ├─LineLayout2.jpg
              ├─LineLayout3.jpg
              └─LineLayout4.jpg
FIG.12
```
<printer Capabilitys>                30
    <listLayouts>                    31
        <lineFormatA/>               32
        <lineFormatB/>
        <lineFormatC/>
        <Original1>
    </listLayouts>
</printer Capability>
```
FIG.13
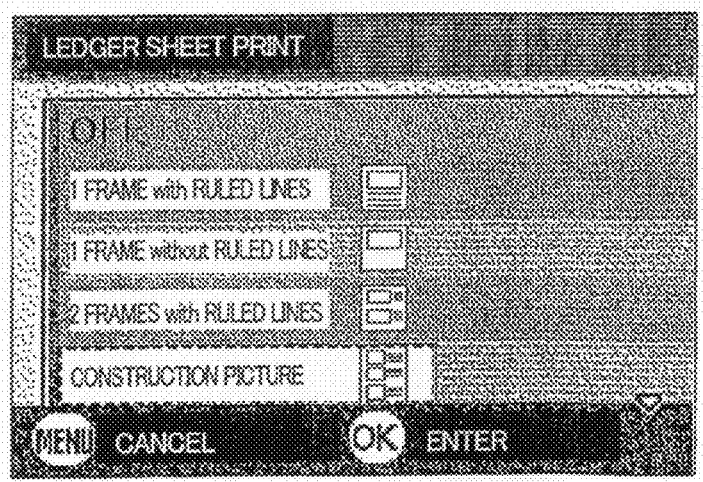

IMAGING APPARATUS AND METHOD OF DISPLAYING AN OPERATION SELECTION SCREEN

CROSS-REFERENCE TO RELATED APPLICATION

The present application is a National Stage of PCT/JP2006/309614, filed on May 8, 2006, and claims priority from Japanese Patent Application No. 2005-142314, filed on May 16, 2005, the contents of which are hereby incorporated by reference herein in their entirety.

TECHNICAL FIELD

The present invention relates to an imaging apparatus capable of directly transmitting a photographed picture image to an external device to output it without passing through a personal computer, etc. Particularly, the invention relates to an imaging apparatus capable of displaying a prescribed operation screen without garble on a setting screen for setting output conditions from the imaging apparatus.

BACKGROUND ART

A digital camera is commonly used as an imaging apparatus which converts a picture image taken by an imaging device into digital signals and records the signals on a recording device such as a nonvolatile recording medium. A personal computer is a typical example of an external apparatus capable of being directly connected to a digital camera via communication cable, etc. There are, other than personal computers, function-specialized types of external devices having only specific functions desired by users which are configured to be directly connected to a digital camera and recently the number of such kind of external devices is on the increase.

A printer is a typical example of the function-specialized types of external devices to which a digital camera is connected. Such printer is configured to be directly connected to a digital camera through a communication cable and read out a data file of a picture image (hereinafter, "image file") from a recording medium with a build-in digital camera to print out the read-out image file. This print function performed by a digital camera and a printer capable of being directly connected each other is referred to as a direct print function.

There are a lot of inventions relating to a digital camera having the direct print function (e.g. JP11-88815A, JP11-146311A, JP2000-232617A). Each invention has an improvement in a method of a print process. An example of a picture image print process carried out by a digital camera having a common direct print function is described below referring to a flowchart in FIG. 14. In FIG. 14, each step is represented by "201", "202"....

When a digital camera is connected to a printer via a communication cable to be in a state in which communication is enabled (Step 201), the digital camera requests the printer to transmit information representing the printer's capability of performing processes (hereinafter, "printer capability value") (Step 202). In accordance with the request the printer transmits its own printer capability value to the digital camera (Step 203). The digital camera receives the printer capability value transmitted from the printer (Step 203) and displays available capability items according to the information stored in the received printer capability value on a display device of the digital camera (Step. 205). The "capability items" mean information indicating process contents able to be selected with the digital camera and the information visually displayed on the display device allows to a user to select process contents optionally.

An example of a printer capability value transmitted from the printer to the digital camera and an example of a display of capability items based on the printer capability value are shown in FIGS. 15A and 15B, respectively. FIG. 15A shows the example of the printer capability value. As shown in FIG. 15A, the printer capability value is a script file described in accordance with a predetermined format, including an information identifier 30 indicating that the file represents the printer capability value, an item information identifier 31 indicating capability items which are able to be processed by the printer, and capability item group 32 indicating each capability which a user can select.

FIG. 15B shows an example of an operational selection screen displayed by the digital camera according to the printer capability value. As shown in FIG. 15B, the screen 130 is provided with a screen title display portion 130a and an operational menu display portion 130b. The digital camera previously stores in its internal storage portion data for display in accordance with the capability item group 32 described in the printer capability value. Accordingly, the data for display in accordance with the capability items described in the printer capability value are read out and converted into a screen image in an information format in which the user can easily confirm them and the screen image is displayed.

Referring to FIG. 14, when the user determines desired picture images after she/he selects a capability item on the operational selection screen (Step 206) and then a print request process is carried out through an operation of the digital camera, the digital camera generates and transmits a print request information file to the printer (Step 207). The printer which received the print request file requests the digital camera to transmit the image files to be printed out described within the print request information file and the digital camera transmits to the printer the image files requested to be sent (Step 208). The printer generates and prints out output data with use of the received image files, and transmits result information whether the print process is completed normally or erroneously to the digital camera. If the result information indicates an erroneous completion of the print process, the digital camera terminates the print process ("No" at Step 209). If the print process is completed normally ("Yes" at Step 209), the digital camera judges whether the print process for all image files previously selected is completed or not, and if any unprinted image file exists, the process is repeated from Step 207 ("No" at Step 210).

As described, in order to carry out a specific process desired by a user in the above-explained print process, a corresponding operation to the digital camera is required. To carry out such operation a printer capability value transmitted from the printer need be displayed as visible information. In the case where information to which the digital camera side cannot reply is included in information described in the printer capability value due to extended functions of the printer, corresponding items cannot be displayed.

If an exclusive display data for all printer capability values to which the digital camera cannot reply is set in advance, it can be avoided that nothing is displayed when the digital camera receives such printer capability value. However, according to this setting, a user can hardly understand what kind of process is carried out by an operation.

DISCLOSURE OF THE INVENTION

The present invention has been made in consideration of above mentioned actualities, thus one object of the invention is to provide an imaging apparatus having the direct print function capable of visually displaying a new function added to a printer side on an operation screen for carrying out a necessary setting for a print process and/or capable of allowing a user to select display method for better understanding.

One aspect of the present invention is that an imaging apparatus may comprise: a recording unit which records therein as an image file an image data generated through conversion from an optical image representing a photographed subject into an electrical signal; and an interface for connecting the imaging apparatus to an external device; wherein the imaging apparatus receives information about a capability able to be processed (i.e. "processable") by the external device and further includes a displaying unit which displays an operation screen according to the received information.

The operation screen displayed by the display unit may be displayed according to information for display generated by using a character string included in the information transmitted from the external device. The information for display may be generated after the character string is converted to a character code which the displaying unit can display. The information for display may be generated by using image information received together with the information transmitted from the external device. The image information may be generated by combining a plurality of image data after the image data are received.

EFFECT OF THE INVENTION

According to the present invention, in a process for displaying an operation screen of an imaging apparatus if information itself transmitted from an external device cannot be displayed by the imaging apparatus, an operation screen with high visibility can be generated by converting the received original information to a displayable character code. Such operation screen may be generated by using icon information and/or image information. Thus, a user can carry out a selection operation easily.

These and other objects, features and advantages of the invention will be appreciated upon reading of the description of the invention when in conjunction with the attached drawings, with the understanding that some modifications, variations and changes of the invention could be easily made by the skilled person in the art to which the invention pertains without departing from the spirit of the invention or the scope of the claims The present application is based on, and claims priority from, Japanese Patent Application No. 2005-142314, filed on May 16, 2005, the contents of which are hereby incorporated by reference herein in its entirety.

BRIEF DESCRIPTION OF THE DRAWINGS

For a better understanding of the invention, reference is made to the attached drawings, wherein:

FIG. 5 is a flowchart showing another example of a display process of an operation menu carried out by the imaging apparatus according to the present invention;

FIG. 6 is a view showing an example of description of a printer capability value file transmitted to a digital camera from a printer applicable to the present invention;

FIG. 7 is a view showing an example of icon files transmitted to a digital camera from a printer applicable to the present invention;

FIG. 10 is a view showing an example of image files to be backgrounds transmitted to a digital camera from a printer applicable to the present invention;

FIG. 11 is an explanatory view showing an image, which is to be stored in a recording device, of a printer of image files to be backgrounds transmitted to a digital camera from a printer applicable to the present invention;

FIG. 12 is an example of description of a printer capability value file transmitted to a digital camera from a printer applicable to the present invention;

FIG. 13 is an explanatory view showing an example of a screen display of the imaging apparatus according to the present invention;

EXPLANATION OF NUMERALS

Figure 1:
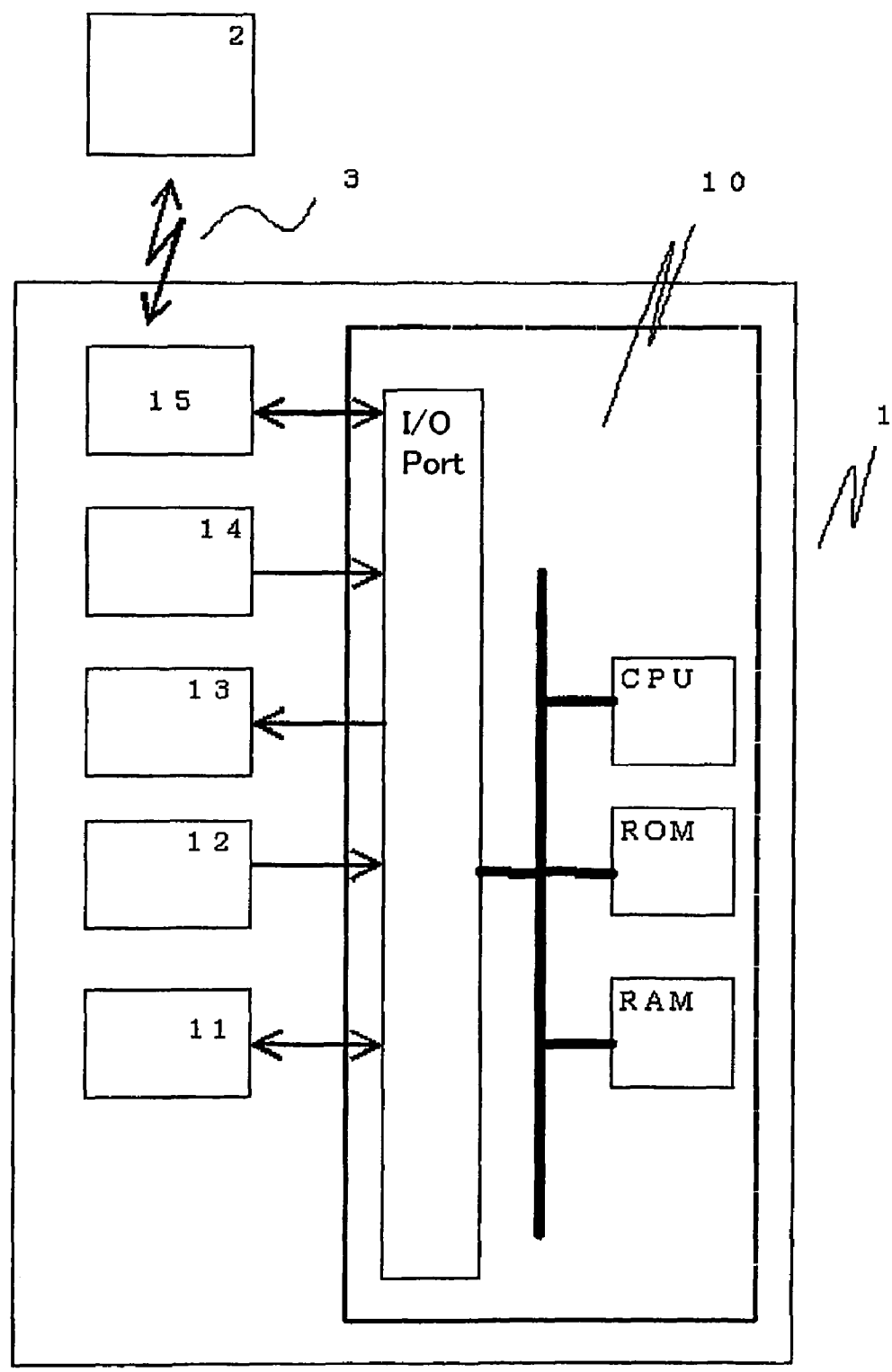
FIG. 1 is a block diagram showing a control system of a digital camera as an example of an imaging apparatus according to the present invention.

1: Digital camera
2: Printer
3: Communication means
30: Information identifier
31: Item information identifier
32: Capability item group
33: Capability item
34: Character code information
35: Displaying order information

DETAILED DESCRIPTION OF THE PREFERRED EMBODIMENTS

One embodiment of the present invention will be described below referring to the drawings. FIG. 1 is a functional block diagram showing an example of an imaging apparatus according to the present invention.

In FIG. 1, the digital camera is provided with an external recording unit 11 for recording an image file of a photographed picture image, an imaging device 12 as an input portion of imaging information such as a CCD and an AD converter, a display device 13 configured to display various information relating to a photographing image setting, various information concerning photographing operations and the like, an operational table 14 with which an input operation from the outside can be carried out, a communication I/F 15 configured to control a communication interface to a printer 2, and an entire control unit 10 configured to control the digital camera entirely.

The external recording unit 11 includes a recording medium as typified by a flash memory, etc. and a driver unit for controlling operations of writing in/readout from the recording medium. The entire control unit 10 can be composed of a conventionally-known microcomputer including a CPU, a ROM, a RAM, an input/output port (I/O port), bus lines which connect therebetween and the like.

The digital camera 1 can be connected to the external device 2 through a communication means 3 connected to the communication I/F 15 to be able to communicate with the external device 2. Either wire transmission or wireless transmission can be used for the communication means 3. A USB (Universal Serial Bus) can be a typical example for wire transmission. A short-range wireless communication system such as Bluetooth, Wi-fi (wireless LAN standards), IrDA, etc. is commonly and widely used as a wireless transmission method. A USB is popularly used as a communication device.

A storage portion composed of the ROM and the RAM may be provided with nonvolatile memories (e.g. flash memories) in which processing procedures for the CPU (i.e. programs) are stored. Processes for displaying an operation selection screen according to the present invention can be embodied by such programs stored in the storage portion. When a print process program is executed, the storage portion records various parameters used by the program and functions as a work area used by the CPU and as a buffer memory while image files are transmitted to the printer 2.

First Embodiment

Figure 2:
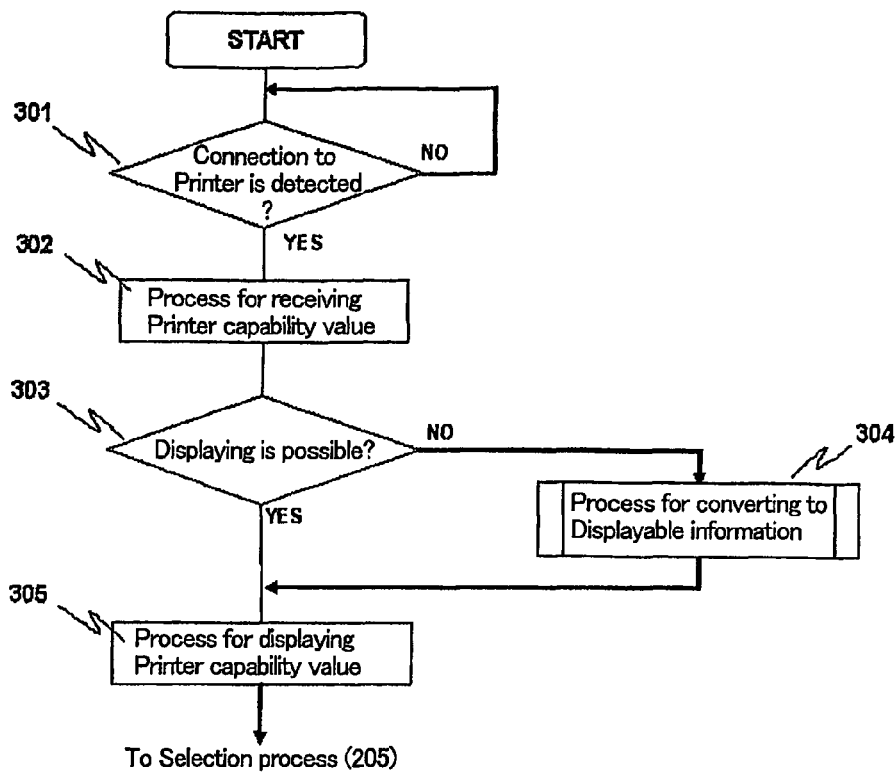
FIG. 2 is a flowchart showing an example of a display process of an operation menu carried out by the imaging apparatus according to the present invention.

An embodiment of a process for displaying an operation selection screen according to an imaging apparatus of the present invention will be described below referring to the flowchart in FIG. 2. Each step in FIG. 2 is designated by "301", "302" . . . .

When the digital camera as the imaging apparatus is connected to the printer 2 via the communication I/F 15 to be able to communicate thereto (Step 301), the CPU as a control portion of the digital camera requests the printer 2 to sent a printer capability value to receive the printer capability value (Step 302). Then a process for judging whether the digital camera 1 has all data for display (hereinafter "data for display" is designated as "display data") corresponding to all capability items included in the received printer capability value or not is carried out (Step 303). If a result of the judgment process indicates that no display data corresponding to the printer capability value exists ("NO" at Step 303), a conversion process for generating displayable display data is carried out (Step 304). An operation selection screen is displayed on the display device with use of the display data generated in the conversion process.

Figure 14:
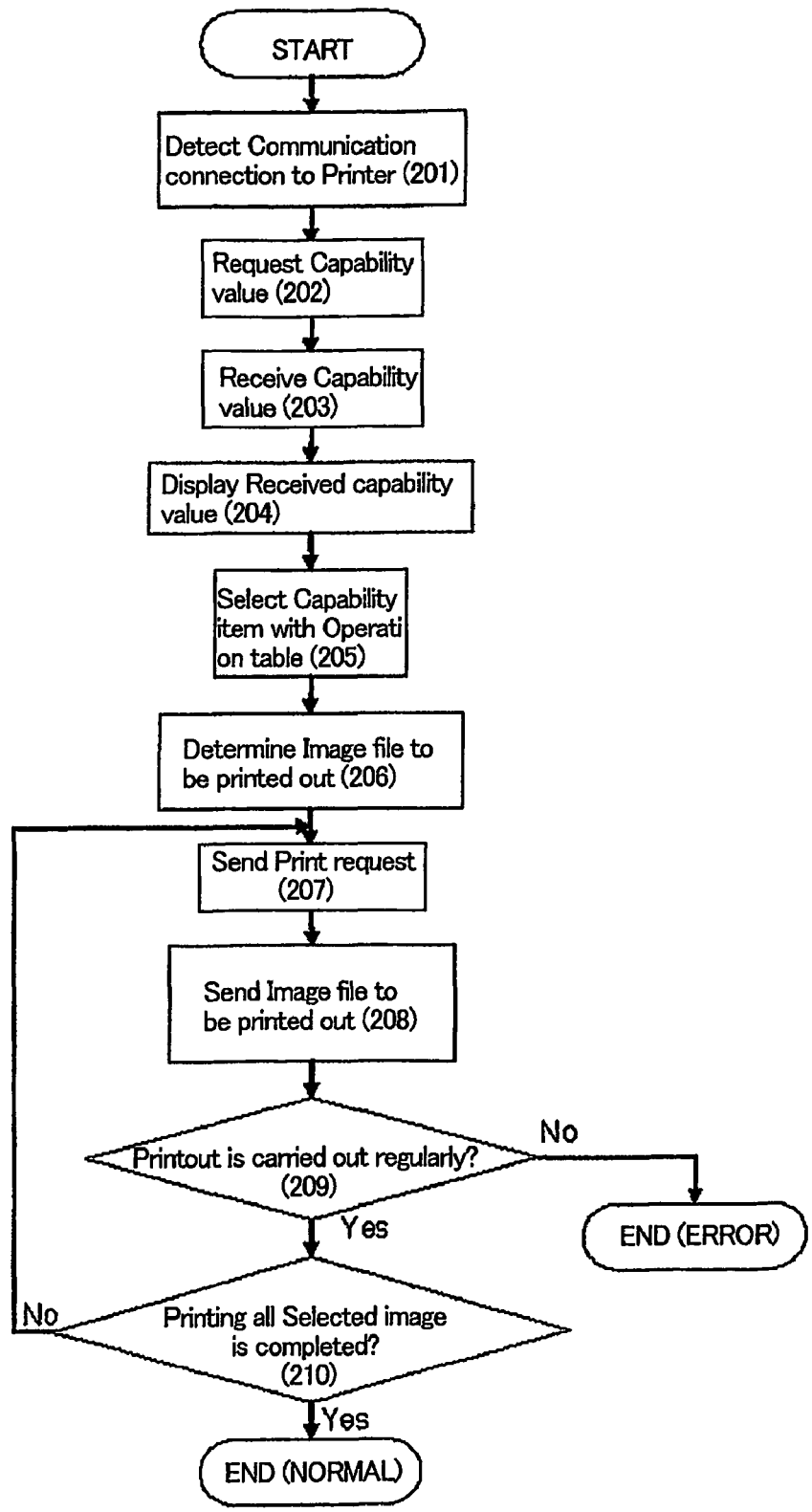
FIG. 14 is a flowchart showing an example of print process carried out by the imaging apparatus according to the present invention.
Figure 15A:
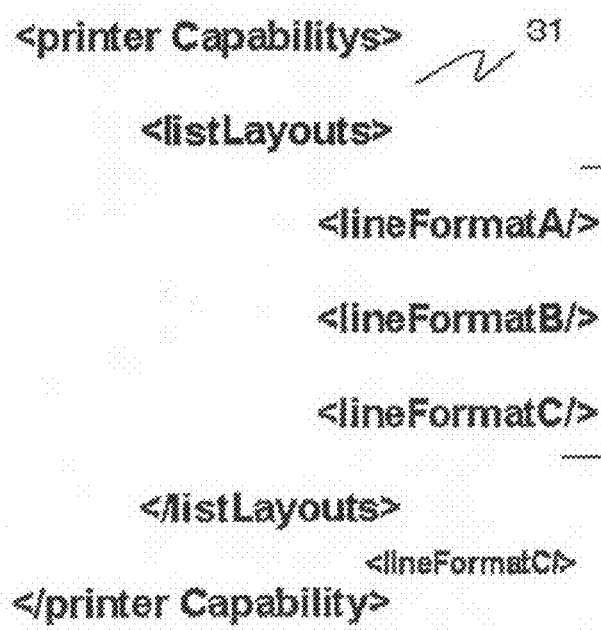
FIG. 15A is an explanatory view showing a printer capability value file transmitted to a digital camera from a printer applicable to the present invention and FIG. 15B is an explanatory view showing an example of a screen display of the imaging apparatus according to the present invention with use of the printer capability value file.
Figure 15B:
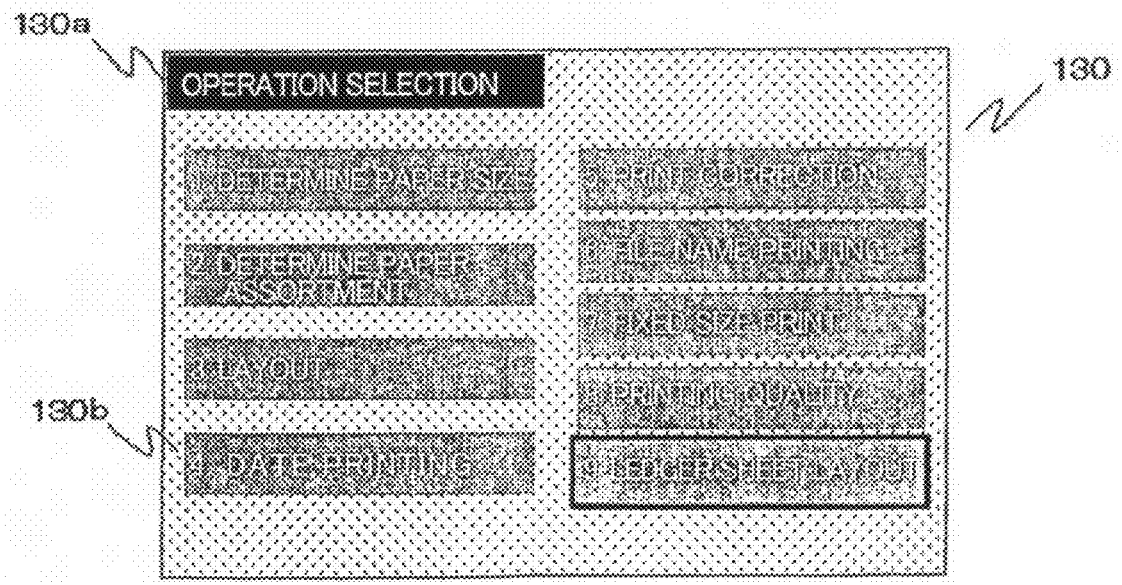

A user makes a desired selection from capability selection operations on the operation selection screen displayed as a result of the process by way of using the operation table 14. After this process, the same processes described above are carried out (Step 205 in FIG. 14).

The conversion process will be described below. When the digital camera 1 receives printer capability value as shown in FIG. 2 and if the digital camera does not have display data corresponding to a capability item groups 32 included in the printer capability value, digital camera 1 carries out a display process for displaying an operation selection screen with use of a character string(s) included in the capability item groups 32. In an example of a printer capability value shown in FIG. 3, a capability item 33 includes the capability item groups 32, character code information 34 and displaying order information 35.

Figure 3:
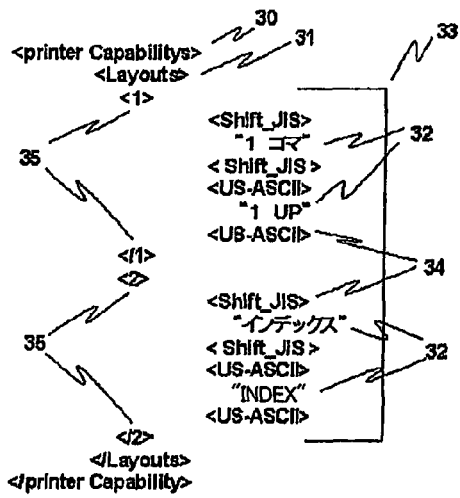
FIG. 3 is a view showing an example of description of a printer capability value file transmitted to a digital camera from a printer applicable to the present invention.

In the case the character code type which the digital camera is capable of displaying is only "US-ASCII", when the digital camera receives the printer capability value shown in FIG. 3 display data capable of being displayed (i.e. "displayable") on the operation selection screen are "1 UP" and "INDEX", and display data are generated so that "1 UP" and "INDEX" respectively as first and second items of the operation selection screen corresponding to <Layouts> designated by the item information identifier 31 are displayed.

Figure 4:
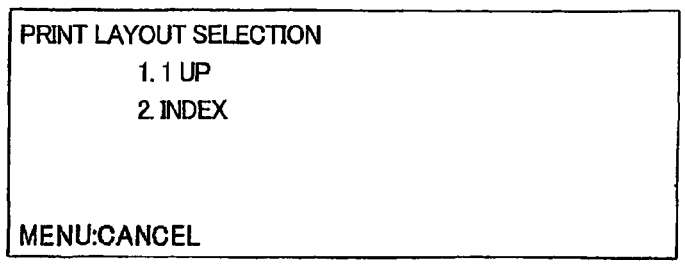
FIG. 4 is an explanatory view showing an example of a screen display of the imaging apparatus according to the present invention.

An example of the operation selection screen displayed according to the conversion process is shown in FIG. 4.

As described above, if a function is added to the printer side so that a capability item included in a printer capability value is added, displayable display data can be generated with use of information included in the received printer capability value. Thus, all operationally selectable items corresponding to the received printer capability value can be displayed the operation selection screen.

Second Embodiment

Another embodiment of the display process of the operation selection screen according to the imaging apparatus of the present invention will be described referring to the flowchart of FIG. 5. In FIG. 5 each step is designated by "501", "502" . . . .

When the digital camera 1 as the imaging apparatus is connected to the printer 2 through the communication I/F 15 so that the status thereof becomes the one where the digital camera 1 is able to communicate with the printer (Step 501), the digital camera 1 requests the printer 2 to send a printer capability value. A printer capability value from the printer 2 is received (Step 502), and after it is received whether (an) icon files corresponding to the printer capability value are received or not is judged (Step 503). If (an) icon files are received in the receiving process ("YES" at Step 503), a process for generating display data is carried out with use of the printer capability value and the icon files (Step 504) to display an operation selection screen according to the generated display data.

Examples of the printer capability value and the icon files transmitted from the printer 2 to the digital camera 1 are shown in FIGS. 6 and 7 for the above-mentioned embodiment. The same numerals which are used for the already-described printer capability value are applied to equivalent capability values in FIG. 6. A capability item group 32 included in the printer capability value is provided with selectable four capability items: <lineFormatA>; <lineFormatB>; <lineFormatC>; and <lineFormatD>. The four capability items are layout capabilities. Here, the "icon files" means files including a plurality of icons for displaying capabilities corresponding to the printer capability value with figure images. Such icon files are a sort of image information in bitmap format and the like. An example of the icon files are shown if FIG. 7. In FIG. 7, file names each corresponding to capability items included in the printer capability value are allotted to the icon files, respectively.

Display data are generated with use of the icon files and the display data corresponding to the capability item group 32 and are displayed on the display apparatus 11. An example of the operation selection screen is shown in FIG. 8.

Figures 8, 9:
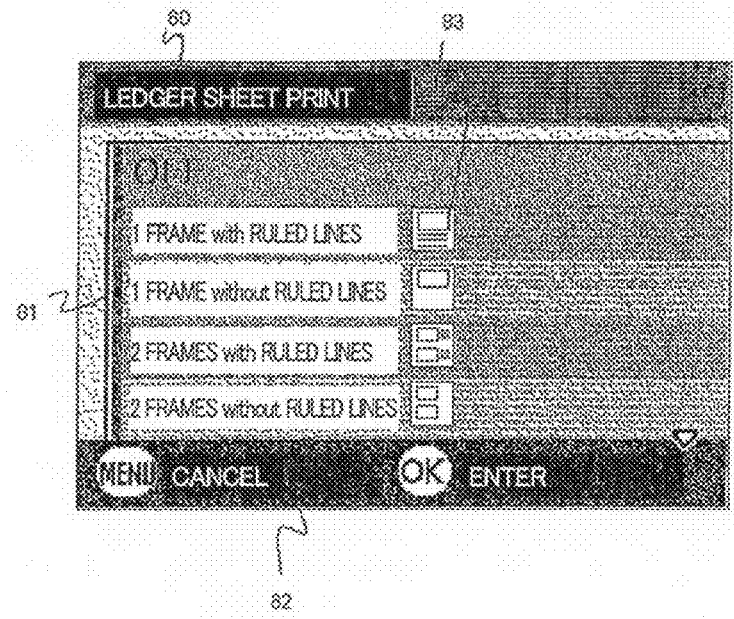
FIG. 8 is an explanatory view showing an example of a screen display of the imaging apparatus according to the present invention.
FIG. 9 is a view showing an example of description of a printer capability value file transmitted to a digital camera from a printer applicable to the present invention.

As shown in FIG. 8 the operation selection screen is provided with a title 80, selection items 81, a setting operation expression 82 and icons 83.

By way of operating the operational table 14 to select and set one of the selection items, an image file can be printed with use of the set layout capability.

In the display data generating process, if a printer capability value received by the digital camera 1 includes a display generating rule 35 as shown in FIG. 9 rather than assigns icon files corresponding to the capability item group 32, display icons each corresponding to capability items can be generated according to information about the number of frames <listLayoutKomaNum> and information about existence/nonexistence of a ruled line <listLayoutLine>. The operation selection screen shown in FIG. 8 can be displayed in accordance with the generated display icons and the capability items of the capability item group 32.

Third Embodiment

Another embodiment of the operation selection screen according to the imaging apparatus of the present invention will be described below.

The digital camera 1 is connected to the printer 2 through the communication I/F 15 and receives a printer capability value from the printer 2 as well as (an) image files recorded in a storage portion (not shown) of the printer 2.

An example of image files transmitted from the printer 2 is shown in FIG. 10. In FIG. 10, the four image files are in JPEG format and recorded in the storage portion of the printer 2. The image files are recorded in a file structure as shown in FIG. 11.

The digital camera 1 executes a reduction process of the received image files and by way of using the reduced image files as substitutes for icons in a display data generating process the operation selection screen as shown in FIG. 8 can be displayed.

Fourth Embodiment

Another embodiment of a display process for displaying the operation selection screen according to the imaging apparatus of the present invention will be described below.

If the digital camera 1 connected to and capable of communicating with the printer 2 receives a printer capability value as shown in FIG. 12, the operation selection screen shown in FIG. 13 can be displayed according to a character string of <Original> included in the capability item group 32.

The example of the display screen in FIG. 13 is the one where <Original> is converted to "CONSTRUCTION PHOTOGRAPH" to generate display data. As described, display data corresponding to the prescribed capability items may be stored in the storage portion of the digital camera 1 so that a user can voluntarily set display data.

INDUSTRIAL APPLICABILITY

The present invention is also applicable to a portable telephone with a camera and the like capable of being connected to a printer through USB connection.

The invention claimed is:

1. An imaging apparatus, comprising:
    a recording unit configured to record therein as an image file an image data, the image data generated through conversion from an optical image representing a photographed subject into an electrical signal;
    a receiving unit configured to receive information from an external device, the received information including a capability item corresponding to a capability processable by the external device, the capability item corresponding to a setting of the external device for the capability;
    a display information generating unit configured to generate displayable character code for display of an input area corresponding to the setting, when the imaging apparatus receives the information from the external device and it is determined that displayable character code corresponding to the setting is not previously recorded in the imaging apparatus; and
    a displaying unit configured to display the input area in an operation screen in order to set the setting corresponding to the capability item.

2. The imaging apparatus according to claim 1, wherein the received information includes character string data associated with the capability item, and
    the displayable character code is generated by converting the character string data.

3. The imaging apparatus according to claim 1, wherein the received information transmitted from the external device includes image information and the displaying unit is configured to display the input area in the operation screen with use of the image information.

4. The imaging apparatus according to claim 3, wherein the image information includes an icon.

5. The imaging apparatus according to claim 4, wherein the icon is generated by reducing a background image data used in a print process.

6. The imaging apparatus according to claim 1, wherein the received information transmitted from the external device includes image information and the displaying unit is configured to display the input area in the operation screen with use of the image information and character string data included in the transmitted information.

7. The imaging apparatus according to claim 6, wherein the image information includes an icon.

8. The imaging apparatus according to claim 7, wherein the icon is generated by reducing a background image data used in a print process.

9. The imaging apparatus according to claim 1,
    wherein the capability is associated with one of paper size, paper assortment, layout, date printing, print correction, file name printing, fixed size print, printing quality, and ledger sheet layout.

10. The imaging apparatus according to claim 1,
    wherein the capability item defines one of a paper size setting, a paper assortment setting, a layout setting, a date printing setting, a print correction setting, a file name printing setting, a fixed print setting, a printing quality setting, and a ledger sheet layout setting.

11. A method of displaying a screen in an imaging apparatus, comprising:
    recording as an image file an image data, the image data generated through conversion from an optical image representing a photographed subject into an electrical signal;
    receiving information from an external device, the received information including a capability item corresponding to a capability processable by the external device, the capability item corresponding to a setting of the external device for the capability;
    generating displayable character code for display of an input area corresponding to the setting, when the imaging apparatus receives the information from the external device and it is determined that displayable character code corresponding to the setting is not previously recorded in the imaging apparatus; and displaying the input area in an operation screen in order to set the setting corresponding to the capability item.

12. The method of displaying a screen in an imaging apparatus according to claim 11, wherein the received information includes character string data associated with the capability item, and the displayable character code is generated by converting the character string data.

13. The method of displaying a screen in an imaging apparatus according to claim 11, further comprising:

recording displayable character code in a recording unit, the displayable character code corresponding to the received information; and checking whether the displayable character code is previously recorded in the recording unit; wherein the generating generates the displayable character code according to the received information after it is determined that the displayable character code is not previously recorded in the recording unit; and the displaying the input area in the operation screen includes displaying the operation screen according to the generated displayable character code.

14. The method of displaying a screen in an imaging apparatus according to claim 11, wherein the received information transmitted from the external device includes image information, and the displayable character code is generated with use of the image information.

15. The method of displaying a screen in an imaging apparatus according to claim 14, wherein the image information includes an icon.

16. The method of displaying a screen in an imaging apparatus according to claim 15, wherein the icon is generated by reducing a background image data used in a print process.

17. The method of displaying a screen in an imaging apparatus according to claim 11, wherein the received information transmitted from the external device includes image information, and the displayable character code is generated with use of the image information and character string data included in the transmitted information.

18. The method of displaying a screen in an imaging apparatus according to claim 17, wherein the image information includes an icon.

19. The method of displaying a screen in an imaging apparatus according to claim 18, wherein the icon is generated by reducing a background image data used in a print process.

* * * * *